C. H. QUINLAN.
ELECTRIC WATER HEATER.
APPLICATION FILED JULY 1, 1914.
1,136,365.
Patented Apr. 20, 1915.
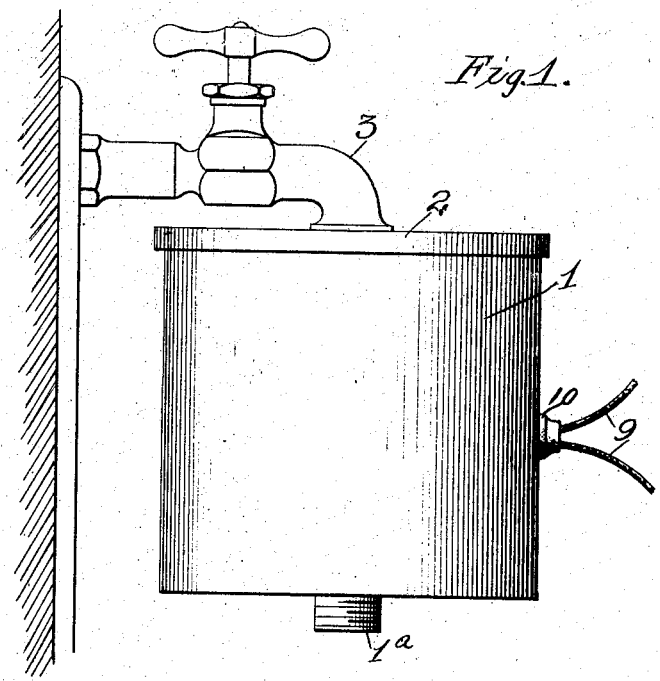
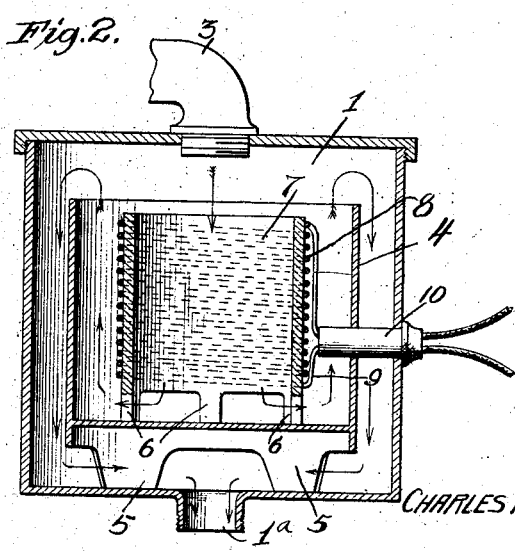
Witnesses
Inventor
CHARLES H. QUINLAN,
By Munn & Co.
Attorneys

UNITED STATES PATENT OFFICE.

CHARLES H. QUINLAN, OF AMSTERDAM, NEW YORK.

ELECTRIC WATER-HEATER.

1,136,365.  Specification of Letters Patent. Patented Apr. 20, 1915.

Application filed July 1, 1914. Serial No. 848,483.

*To all whom it may concern:*

Be it known that I, CHARLES H. QUINLAN, a citizen of the United States of America, residing at Amsterdam, in the county of Montgomery and State of New York, have invented certain new and useful Improvements in Electric Water-Heaters, of which the following is a specification.

This invention relates to improvements in electrical water or liquid heaters.

The invention has for its object to provide for conveniently and quickly heating a quantity of water or other liquid.

A further object is to provide for carrying out the aforesaid end in a simple, inexpensive and effective manner.

The invention therefore consists of certain structural features, including the combination and arrangement of parts substantially as hereinafter fully disclosed and defined by the appended claim.

In the accompanying drawing is illustrated the preferred embodiment of my invention wherein it will be understood that various changes and modifications as to the detailed construction and arrangement of parts may be made without departing from the spirit of the invention, and in which drawing:—

Figure 1 is a side elevation of my invention. Fig. 2 is a vertical central section thereof.

In putting my invention into practice, I provide a suitable receptacle or container 1, which is screw-threaded or attached in its cover or closure 2 centrally to the discharge end of a bib-cock or faucet 3, connected to the service pipe (not shown) in the wall of a room or apartment of the house.

Within the container or receptacle 1 is suitably supported a second or inner receptacle 4 for holding, preferably, water, said inner receptacle having suitable legs 5 preferably integral therewith for elevating it above the bottom of said outer receptacle 1, said container also having a nozzled discharge opening 1ª in its bottom.

Within the inner receptacle is suitably supported upon legs 6, in an elevated position, a bottomless receptacle or holder 7, around or upon which are arranged circuit-wire coils 8, 9, the wires being extended through a non-conductor or socket 10 of the electric light cord attachment type, and connected to an electric battery (not shown), said tubular members being carried through and supported in the walls of the receptacles 4 and 1.

From this arrangement it is apparent that water or liquid running from the faucet or cock 3 into the innermost receptacle 7, after due connection has been made with the battery, will become heated, together with the water in the receptacle 4, which water enters the latter from the lower end of the innermost receptacle 7, the water then overflowing the inner receptacle 4 and entering the outer receptacle 1 and finally passing out through the nozzled discharge-opening 1ª of the receptacle 1 where it may be received into a pitcher or other suitable means.

The provision of the openings near the bottom of the innermost receptacle 7 insures the passage of the water through the heater after the receptacles 4 and 7 are filled to overflowing, since the force of the water from the spigot 3 downwardly into the interior of the receptacle 7, together with the fact that the colder water naturally tends to descend, causes it to pass underneath the openings and thence up between the receptacles 7 and 4, thence over the edge of the receptacle 4 and down to the outlet 1ª.

It is observed that, among other advantages, my invention is handy and ready of application; it is useful in the sick room, as well as for general purposes; it is a great boon especially for house renters and house-rooming people; expense of operating the device is very little; and it is manufacturable at small expense.

I claim:—

The combination with a faucet, of a water heating device consisting of an exterior cylindrical receptacle provided with a top having a threaded opening arranged to be screwed on to the end of the faucet and provided with a centrally disposed outlet at its bottom, an inner cylindrical receptacle provided with legs arranged to rest on the bottom of said outer receptacle; a third innermost cylindrical receptacle carried by the bottom of said second named receptacle and being provided with openings near its bottom for communication with the interior of said second named receptacle, the inlet end of the faucet being directly above the center of the innermost receptacle, an electric heating coil surrounding said innermost receptacle, and a conduit extending through the walls of said outer receptacle and said second named receptacle for housing the terminals of said coil.

In testimony whereof I affix my signature in presence of two witnesses.

CHARLES H. QUINLAN.

Witnesses:
FREEMAN S. KLINE,
WILLIAM P. HOVER.